United States Patent [19]

DiGiulio et al.

[11] 4,278,768

[45] Jul. 14, 1981

[54] RUBBER-MODIFIED FIRE-RETARDANT ANHYDRIDE COPOLYMERS

[75] Inventors: Adolph V. DiGiulio; Jack N. Bauer, both of Pittsburgh, Pa.

[73] Assignee: Arco Polymers, Inc., Philadelphia, Pa.

[21] Appl. No.: 147,666

[22] Filed: May 7, 1980

[51] Int. Cl.$^3$ .............................. C08J 9/06; C08J 9/12
[52] U.S. Cl. .............................. 521/88; 260/45.95 G; 521/82; 521/83; 521/92; 521/139; 521/147; 525/221
[58] Field of Search ................ 260/45.95 G; 521/139, 521/147, 88, 92, 83, 82

[56] References Cited

U.S. PATENT DOCUMENTS

| | | | |
|---|---|---|---|
| 2,864,777 | 12/1958 | Greenhoe | 521/92 |
| 2,911,382 | 11/1959 | Barkhuff, Jr. et al. | 521/92 |
| 3,676,378 | 7/1972 | Heil et al. | 521/147 |
| 4,207,402 | 6/1980 | Sprenkle, Jr. | 521/139 |

*Primary Examiner*—Morton Foelak
*Attorney, Agent, or Firm*—Lewis J. Young

[57] ABSTRACT

Rubber-modified copolymers of monovinyl aromatic monomers and the anhydride of ethylenically unsaturated dicarboxylic acid monomers are blended with water as a blowing agent, bromodiphenylethers as fire retardants, and metal oxides as synergist for the ethers to form a composition which can be foamed to densities of between 1 and 10 pounds per cubic foot, said foam composition having fire-retardant properties.

7 Claims, No Drawings

RUBBER-MODIFIED FIRE-RETARDANT ANHYDRIDE COPOLYMERS

BACKGROUND OF THE INVENTION

This invention relates to fire-retardant foamed polymers.

U.S. Pat. No. 3,075,944 teaches the use of bromodiphenylethers with metal oxide synergists for making fire-retardant polystyrene and polyethylene.

U.S. Pat. No. 4,151,218 teaches the use of the same synergistic fire-retardant system for copolymers of styrene and maleic anhydride alone and rubber-modified.

The use of volatile hydrocarbon blowing agents to prepare foams of polystyrene is well known. These blowing agents are flammable hydrocarbons such as pentane and hexane.

U.S. Pat. No. 2,911,382 teaches the use of mixtures of volatile hydrocarbon blowing agents and water or hydrated salts.

Canadian Pat. No. 844,652 teaches the use of water or hydrated salts as the sole blowing agent for copolymers of styrene and acrylic acid.

SUMMARY OF THE INVENTION

We have now found that fire-retardant foams can be prepared from compositions consisting of a blend of rubber-modified polar polymers with from 2 to 6 percent by weight based on polymer of water as the blowing agent, a brominated diphenylether as flame retardant and a synergist for the flame retardant selected from certain metal oxides. Herein, the rubber-modified polar polymers are copolymers of vinyl aromatic monomers and the anhydride of an ethylenically unsaturated dicarboxylic acid monomer.

DETAILED DESCRIPTION OF THE INVENTION

The invention consists of a fire-retardant foamed composition and a process for making said foam.

The foamed composition has a density of between 1 and 10 pounds per cubic foot and consists of a rubber-modified copolymer of 50 to 95 mole percent of a monovinyl aromatic monomer and 5 to 50 mole percent of the anhydride of an ethylenically unsaturated dicarboxylic acid monomer, from 10 to 20 parts per hundred parts of copolymer of an at least tribrominated diphenylether, and 4 to 8 parts per hundred parts of copolymer of a synergist for the ether.

The foamed composition is prepared by a process consisting of blending a mixture of (a) a rubber-modified copolymer of 50 to 95 mole percent of a monovinyl aromatic monomer and 5 to 50 mole percent of the anhydride of an ethylenically unsaturated dicarboxylic acid monomer; (b) from 0.5 to 10 percent by weight of water; (c) from 10 to 20 parts per hundred parts of copolymer of an at least tri-brominated diphenylether; and (d) 4 to 8 parts per hundred parts of copolymer of a metal oxide synergist for the ether until an intimate blend is obtained; heating said blend to a temperature of between 125° and 190° C. under sufficient pressure to prevent foaming of the blend; releasing the pressure to allow the polymer blend to expand to a foam of density between 1 and 10 pounds per cubic foot; and cooling the resultant polymer foam to room temperature.

The anhydride copolymers useful in the present invention may be prepared by any of the known methods, such as direct copolymerization of a monovinyl aromatic monomer with an ethylenically unsaturated dicarboxylic acid anhydride by continuous controlled addition of the more reactive anhydride monomer to produce the copolymer of the desired composition.

The monovinyl aromatic monomers useful in the copolymers are styrene, alpha-methylstyrene, nuclear-methylstyrenes, ethylstyrene, isopropylstyrene, tert-butylstyrene, chlorostyrenes, dichlorostyrenes, vinylnaphthalene and mixtures of these.

Suitable anhydrides are the anhydrides of maleic acid, fumaric acid, itaconic acid, citraconic acid, mesaconic acid, ethyl maleic acid, methyl itaconic acid, chloromaleic acid, dichloromaleic acid, bromomaleic acid, dibromomaleic acid, and mixtures thereof and the like.

The anhydride copolymers may contain from 5 to 50 mole percent of anhydride and 95 to 50 mole percent of monovinyl aromatic monomer.

For the rubber-modified copolymers, the starting copolymers may be any of the above anhydride copolymers into which 5 to 40 percent by weight of one of the known rubbers has been incorporated. The rubbers may be incorporated into the anhydride copolymers by blending, mixing, or copolymerizing the monomers in the presence of the rubber. A method of preparing the rubber-modified anhydride copolymer is that taught in U.S. Pat. No. 3,919,345, wherein a rubber is dissolved in monovinyl aromatic monomer, polymerization initiated and an ethylenically unsaturated dicarboxylic acid anhydride is added continuously to the polymerizing mixture at a rate sufficient to maintain the concentration of anhydride low.

Suitable rubbers, or elastomers, include conjugated 1,3-diene rubbers, styrene-diene copolymer rubbers, acrylonitrile-diene copolymer rubbers, ethylene-propylene-diene terpolymer rubbers, acrylate-diene copolymer rubbers, and mixtures thereof.

Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene.

The foams of the present invention are prepared using water as the blowing agent. The amount of water which is required will depend upon the desired density of the copolymer foam. Sufficient water should be present to expand the copolymer to the desired density with the density being inversely proportional to the amount of water present. Generally, amounts of water between 0.5 and 10 percent by weight of copolymer are sufficient. The water is preferably used in amounts of from 2 to 6 percent by weight based on the copolymer. Greater than 10 percent water may be used, but the foam cell size begins to become too large.

The water may be introduced into the polymer by any of the known methods. These include direct impregnation of water into the polymer pellets, grinds or beads; direct addition of water to the surface of the pellets; direct injection of water into molten polymer in an extruder; and dryblending the polymer with salts containing water of hydration or water of occlusion.

Hydrated salts suitable for use in the invention include for example gypsum, sodium metasilicate pentahydrate ($Na_2SiO_3 \cdot 5H_2O$), aluminum sulfate ($Al_2(SO_4)_3 \cdot 18H_2O$), magnesium sulfate ($MgSO_4 \cdot 7H_2O$), calcium thiosulphate (CaS$_2$O$_3$·6H$_2$O), sodium tetraborate (Na$_2$B$_4$O$_7$·10H$_2$O), sodium carbonate (Na$_2$CO$_3$·10H$_2$O), etc. and mixtures thereof.

It has been found advantageous to disperse in the polymer compositions a nucleating agent which will aid in the formation of tiny bubbles of the vaporized expanding agent and produce a foam having a fine and uniform cell size particularly when the compositions are foamed by extrusion. The combination of bromodiphenylethers and metal oxides has been shown to have the effect of a nucleating agent, so the use of additional agent is optional. Suitable nucleating agents are finely divided inert solids such as talc, diatomaceous earth, soft wood flour and pecan shell flour. Conveniently from 0.5 to 5 percent by weight of polymer of nucleating agent is employed. Preferrably 1 to 4 percent by weight based on the copolymer is used.

The diphenylethers suitable as flame retardants for the present invention must contain at least three bromine atoms per molecule. The distribution of the bromines on the two phenyl rings is not critical. Examples of such ethers are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether, octabromodiphenylether, and decabromodiphenylether. The preferred ether is decabromodiphenylether.

The diphenylethers will normally be used in concentrations of 10 to 20 parts by weight of ether per 100 parts of copolymer, preferably 12 to 18 parts per 100 of copolymer.

Various synergists for the bromo-compounds may be added in amounts of from 4 to 8 parts per hundred parts of polymer to improve the fire-retardant properties of the foams. Suitable synergists are the metal oxides, such as antimony trioxide, bismuth oxide, molybdenum oxide, stannic oxide and tungsten oxide, and the organic peroxides decomposing at temperatures higher than the extrusion temperature of the foams. The preferred synergist is antimony oxide.

Other known additives and fillers can be used with the proviso that they not interfere with the foaming action of the water blowing agent or with the flame-retardancy of the bromocompounds. Suitable additives may be the various stabilizers, fillers, smoke-suppressants, lubricants, etc.

The expandable compositions may be expanded to fine cell foams of low density in conventional extrusion equipment by placing the blends in an extruder wherein the material is heat plastified and heated to a temperature between 125° and 190° C. after which the material is extruded through an orifice into the atmosphere. Foams of from 1–10 pcf density are easily obtained. The base polymers have higher second-order transition temperatures than, for example, polystyrene, with the transition temperature increasing with increasing anhydride content, and hence the foams are useable at higher temperatures.

The invention is further illustrated but not limited by the following example in which parts are parts by weight unless otherwise indicated.

EXAMPLE I

A blend was prepared of 100 parts of a rubber-modified styrene-maleic anhydride copolymer, containing 6 wt-% water and having 78.2 wt-% styrene, 6.8 wt-% maleic anhydride, 15 wt-% of a rubber consisting of butadiene (90%) and styrene (10%) prepared by solution polymerization in a stereospecific system, 15 parts of decabromodiphenylether (DBDPE) and 5 parts of Sb$_2$O$_3$. The blend was extruded through a small 6"×1" L/D laboratory bench type extruder having a ⅛" die orifice at 160°–162° C. extruder temperature. Foam rod, ½ to ⅝" diameter, with small cells, hard skin, some voids and a 3.5 pcf density was produced. It should be noted that although no additional nucleating agent was used, the combination of bromocompound and metal oxide acted as nucleating agent to produce the small cells. When the foam was contacted with a flame from a match or a bunsen burner, the foam did not ignite or burn.

It should be noted that dropping the DBDPE content to 10 parts and the Sb$_2$O$_3$ to 3.3 parts gave a foam product which did ignite and burn.

We claim:

1. A process for making fire-retardant foams consisting of blending a mixture of (a) a rubber-modified copolymer of 5 to 40 weight percent of a rubber selected from the group consisting of homopolymers of conjugated dienes, copolymers of said dienes with up to 50 weight percent of one or more monoolefinically unsaturated monomers, ethylene-propylene-diene terpolymer rubbers, acrylate diene copolymer rubbers, and mixtures thereof and 95–60 weight percent of a copolymer of 50 to 95 mole percent of a monovinyl aromatic monomer and 5 to 50 mole percent of the anhydride of an ethylenically unsaturated dicarboxylic acid monomer; (b) from 0.5 to 10 percent by weight of water; (c) from 10 to 20 parts per hundred parts of copolymer of an at least tri-brominated diphenylether; and (d) 4 to 8 parts per hundred parts of copolymer of a metal oxide synergist for the ether until an intimate blend is obtained; heating the blend to a temperature of between 125° and 190° C. under sufficient pressure to prevent foaming of the blend; releasing the pressure to allow the blend to expand to a foam of density between 1 and 10 pounds per cubic foot; and cooling the resultant foam to room temperature.

2. The process of claim 1 including blending into the mixture from 0.5 to 5 percent by weight of copolymer of a nucleating agent selected from the group consisting of talc, diatomaceous earth, soft wood flour and pecan shell flour.

3. The process of claim 1 wherein said water is in the form of a hydrated salt selected from the group consisting of gypsum, sodium metasilicate pentahydrate, aluminum sulfate, magnesium sulfate, calcium thiosulfate, sodium tetraborate, sodium carbonate and mixtures thereof.

4. The process of claim 1 wherein the synergist for the ether is a metal oxide selected from the group consisting of antimony trioxide, bismuth oxide, molybdenum oxide, stannic oxide and tungsten oxide.

5. The process of claim 1 wherein the monovinyl aromatic monomer of said copolymer is selected from the group consisting of styrene, alpha-methylstyrene, nuclear-methylstyrenes, ethylstyrenes, isopropylstyrenes, tertbutylstyrenes, chlorostyrenes, dichlorostyrenes, vinylnaphthalene and mixtures thereof.

6. The process of claim 1 wherein the diphenylether is selected from the group consisting of tribromodiphenylether, tetrabromodiphenylether, pentabromodiphenylether, tribromochlorodiphenylether, tribromodichlorodiphenylether, tribromotrichlorodiphenylether, tetrabromodichlorodiphenylether, octabromodiphenylether and decabromodiphenylether.

7. The process of claim 1 wherein the anhydride consists of the anhydride of an ethylenically unsaturated dicarboxylic acid selected from the group consisting of maleic acid, fumaric acid, itaconic acid, citraconic acid, mesaconic acid, ethylmaleic acid, methylitaconic acid, chloromaleic acid, dichloromaleic acid, bromomaleic acid, dibromomaleic acid and mixtures thereof.

* * * * *